Patented Nov. 25, 1952

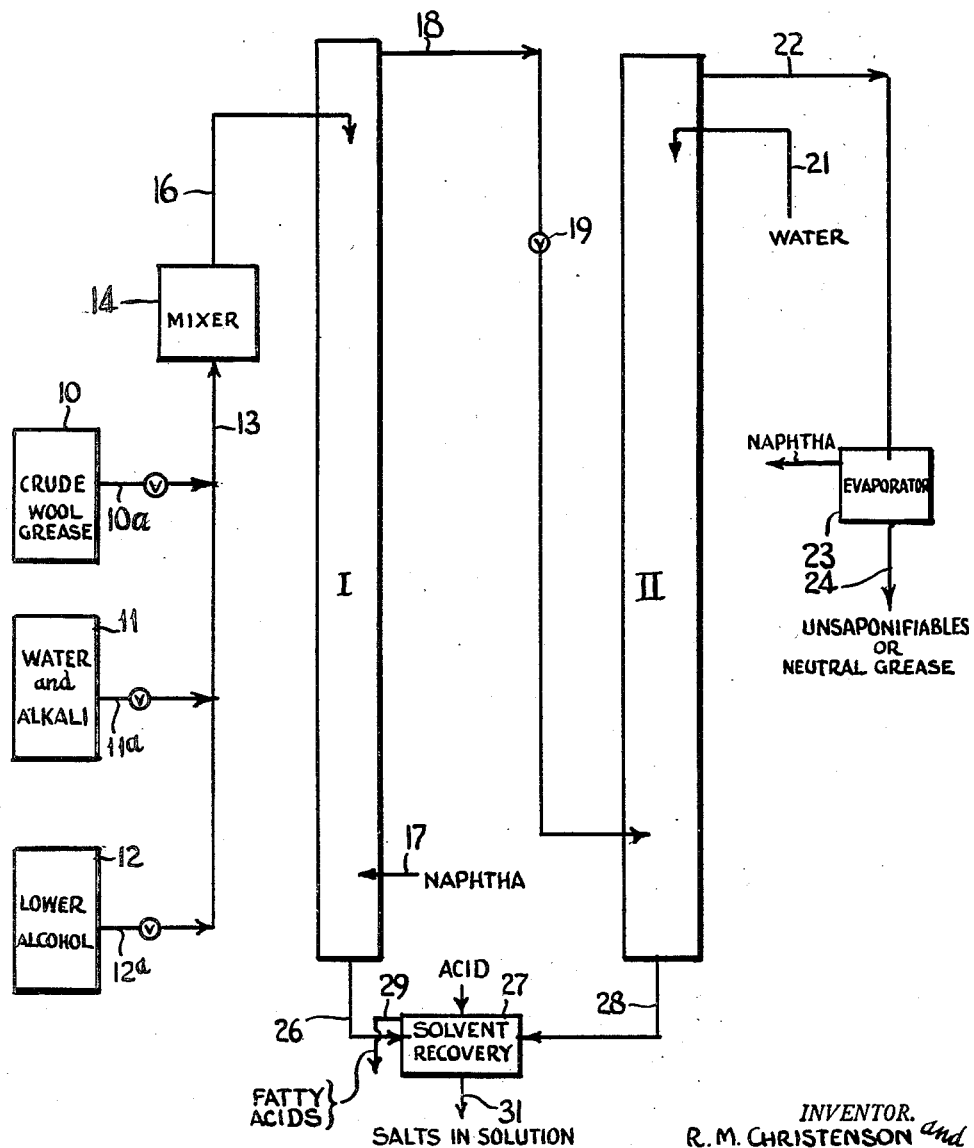

2,619,495

UNITED STATES PATENT OFFICE 2,619,495

PREPARATION OF WOOL GREASE UNSAPONIFIABLE MATTER

Roger M. Christenson and Ralph E. Harpt, Milwaukee, Wis., assignors to Pittsburgh Plate Glass Company Application October 26, 1948, Serial No. 56,646

4 Claims. (Cl. 260—426)

The present invention relates to the treatment of wool grease and it has particular relation to a process of treating wool grease in order to separate it into fractions.

One object of the invention is to provide a process of treating wool grease whereby the free fatty acids or the acids combined in the form of esters may be removed and recovered in a continuous and economical manner.

A second object of the invention is to provide a process whereby the unsaponifiable matter of wool grease may be obtained in a form substantially free of the fatty acids either in free state or combined as esters with the unsaponifiable components of the wool grease in a continuous and economical manner.

A third object of the invention is to obtain from wool grease a concentrate which is highly enriched in cholesterol in a continuous and economical manner.

A fourth object of the invention is to provide a process of treating wool grease to obtain on the one hand a phase which is rich in fatty acids and on the other hand a phase which is rich in unsaponifiable matter, which process is adapted for continuous countercurrent methods of extraction of the different phases using a minimum of solvent.

A fifth object of the invention is to provide a convenient method whereby sterols highly useful in the synthesis of vitamins such as vitamin D and sex hormones can be obtained in a condition well adapted either for further purification by appropriate methods or for direct treatment to convert the sterols into the desired products.

A sixth object of the invention is to separate the fatty acids from the neutral grease in crude wool grease in a continuous and economical manner.

A seventh object is to improve the color of the neutral portion of crude wool grease.

An eighth object is to improve the odor of the neutral portion of crude wool grease.

A ninth object is to secure a nearly quantitative yield of neutral grease from crude wool grease by countercurrent methods.

A tenth object is to provide a neutral grease which can readily be bleached to a high grade lanolin.

An eleventh object is to recover the fatty acids in crude wool grease so that they can be utilized industrially.

A twelfth object of the invention is to provide a concentrate of wool grease unsaponifiable matter which is well adapted for use in cosmetics as an emulsifying agent and in the preparation of creams and ointments.

These and other objects of the invention will be apparent from consideration of the following specification and the appended claims.

Crude wool grease or degras is obtained from the scouring or washing of sheeps' wool with a detergent. The wash waters are acidified and a grease or scum rises to the surface which upon dehydrating consists of from 10 to 25% free fatty acids and from 90 to 75% neutral grease. The neutral portion is composed of esters of higher aliphatic alcohols and sterols and certain straight chain, branched chain or hydroxy fatty acids. There is a vile odor to the mixture and it is dark in color. The free acids of this mixture may be partially derived from the soap used in washing.

The unsaponifiable constituents of the esters of fatty acids in the neutral grease are usually of approximately the following constituents:

| | Percent |
|---|---|
| Cholesterol | 25 to 33 |
| Cholestanol | 2 to 5 |
| Lanosterol | 21 to 27 |
| Agnosterol | 0 to 5 |
| Other alcohols | 25 to 50 |

The lanosterol and agnosterol are considered to be triterpene alcohols while the "other alcohols" are a mixture of aliphatic alcohols, some of which are branched chain.

Heretofore, crude wool grease, after removal of the free fatty acids and as much odor and color as possible, has been marketed as a neutral grease or as lanolin. The price differential between the crude degras and the neutral grease or lanolin is quite large. The price of neutral grease is usually about twice the price of the crude material. The reason for this is the difficulty in separating the fatty acids and the neutral grease efficiently.

Many of the components of the wool grease are highly valuable and the cholesterol is of particular value; since it is a good emulsifying agent and is a convenient starting material for the synthetic production of vitamin D and various sex hormones which are of great value in the pharmaceutical field. Numerous methods have been proposed for recovering the various constituents of the crude wool grease and particularly the cholesterol and the other unsaponifiable constituents. However, no method suitable for extensive commercial application has been available.

The present invention contemplates the provision of a method of refining and fractionating unsaponifiable matter and free fatty acids of crude wool grease to obtain useful products, which is efficient of operation and adapted for commercial application upon an extensive scale. Briefly stated, the invention includes as a feature, saponifying or neutralizing the wool grease with an alkali such as sodium or potassium hydroxide or carbonates of sodium or potassium or ammonium hydroxide to form soluble soaps of the free fatty acids. Optionally, the esters of the fatty acids and the alcoholic or unsaponifiable constituents of the wool grease are split and the acid components are saponified.

The soap solutions are made up with an alcohol and water to obtain liquid solutions. These solutions are then extracted to effect fractionation with solvents of unsaponifiable matter, e. g. with petroleum naphthas, i. e. naphthas of the paraffinic type or diethyl ether, ethylene dichloride or the like which are solvents of lipoid matter but are immiscible with the water and alcohol mixture.

In the practice of the invention, wool grease is partially or completely saponified dependent upon whether only the unsaponifiable matter such as sterols and other higher alcohols are to be removed or whether the neutral esters of these alcohols are to be removed without saponification. If the esters are split and the alcohols recovered as unsaponifiable matter, more alkali will be required.

The required amount of alkali can easily be calculated and should be near or slightly in excess of that theoretically required to neutralize the free fatty acids or to neutralize the fatty acids and also split the neutral esters.

The soap mixtures can be made up with water and a lower alcohol. The provision of a suitable solution of soaps of fatty acids of wool grease and the neutral or the unsaponifiable matter in water and a lower alcohol, e. g. ethyl alcohol or isopropyl alcohol in proper proportions is readily determined by shaking together in a beaker or flask quantities of the solvent of lipoid matter, e. g. naphtha and the soap solution in water and the alcohol. If the proportion of water to the alcohol is correct, 200 or 300 cc. of the liquid phases will separate into well defined layers in 4 or 5 minutes, usually much less time, at normal room temperatures.

The correct proportions of water and alcohol in the soap solution having been determined by such tests for a given sample, the separation of the unsaponifiable matter including the cholesterol and the other higher alcohols is easily conducted by introducing the soap solution comprising the water and alcohol in the indicated proportions into an elongated extraction zone such as a vertical column at a point substantially above the bottom thereof and preferably near the top. In some instances, it may be desirable to reverse the point of introduction of the soap solution, that is, to introduce it near the bottom of the extraction column. This will be determined by the relative specific gravity of the soap solution and the extraction medium, the heavier fluid being introduced at the higher point in the system. Usually however, the extraction medium is of lower specific gravity than the soap solution and is introduced at or slightly above the bottom of the column.

Soap solutions of water and an alcohol containing the fatty acids in the form of soaps is drawn off at the bottom of the column as a liquid extract phase, while the neutral or the unsaponifiable matter in the solvent of lipoids is drawn off as a liquid phase at the top of the column, preferably at a point somewhat above the point of introduction of the soap solution.

The solutions of neutral esters or of unsaponifiable matter in the solvent medium are preferably subject to a second extraction of washing with water in order to remove traces of soap which may be entrained with the unsaponifiable matter.

An appropriate embodiment of apparatus for use in the practice of the invention is illustrated diagrammatically in the single figure of the drawing.

In the drawing, a first column appropriate for the extraction of water and alcohol solutions of wool grease with a solvent of lipoid matter is indicated as I. A second column for washing the solution of unsaponifiable matter with water is designated as II. Column I may be any reasonable length and diameter. Small columns such as are used in the laboratory may be eight feet or less in height but there is no upper limit of height except such as may be imposed by economics of construction and operation. They may be of any convenient material such as steel or the like.

Crude wool grease may be stored in a container 10 while a mixture of water and an alkali such as sodium or potassium hydroxide or sodium or potassium carbonate is stored in a second container 11. The alcohol to be used in the preparation of the soap solution may be stored in a container 12. The alcohol, it will be appreciated, may be any appropriate lower alcohol which is reasonably water soluble. Such alcohols include ethyl or methyl alcohol, isopropyl alcohol, n-butyl alcohol or isobutyl alcohol, ethylene glycol or the monoether such as the methyl or ethyl ether of ethylene glycol. The liquids from the containers 10, 11 and 12 discharge through conduits 10a, 11a and 12a to a common main indicated at 13. It will be appreciated that the lines 10a, 11a and 12a may be provided with appropriate valves V or pumps designed to control proportions and/or to propel the liquids flowing through the lines. This same remark applies also to the various other lines which are to be described. Obviously the number and position of pumping and proportioning apparatus will be determined by the positions and the sizes of the different pieces of apparatus. All of these elements can readily be determined by those skilled in the engineering art.

The various components of the mixture in the line 13 are discharged into a suitable mixing apparatus such as a container 14 provided with suitable agitating and heating elements (not shown) by means of which the mixture is thoroughly commingled and brought to a temperature sufficient to effect the saponification reaction of the various saponifiable constituents (free or combined). The degree of saponification attained will depend upon the proportion of alkali introduced. If only sufficient to neutralize the free fatty acids is introduced, the saponification will be confined almost entirely to the free acids. Alkali in equivalency or in excess of the free and combined acids will also break the esters to form fatty acid soaps and liberate the unsaponifiable matter (largely higher alcohols). The mixer should be sufficiently large to admit of adequate reaction of the alkali with the saponifiable matter before the mixture is discharged to extraction column. In the case of complete saponification, it may be desirable to have a greater proportion of alcohol present during the saponification than during the extraction. In such a case additional water can be introduced after reactor 14 instead of before it. If desired, pressure can be used to aid in saponification. Either a completely continuous system or two saponification kettles operating alternately could be used.

The saponified mixture is discharged from the mixer 14 through a line 16 to the column I. The point of introduction of the saponified mixture in the column is indicated as being near the top of the column and space should be left above the point of introduction to admit of separation of the phases of the liquids introduced into the system. A solvent of unsaponifiable matter such as a paraffinic naphtha, e. g. naphtha boiling within a range of 80 to 130° C. is introduced similarly through line 17 somewhat above the bottom of column I. The column, it is to be appreciated, may be packed with Berl saddles, or provided with baffle plates or bubble plates or any other apparatus to effect thorough commingling of the liquids and to prevent any actual separation of the liquids into streams in their flow through each other. The flow preferably is more in the nature of a continuous permeation of the relatively uniformly distributed liquids but without emulsification, in opposite directions with respect to each other. The neutral grease or the unsaponifiable matter dissolved in the solvent of lipoid matter (e. g. naphtha) is drawn off at or near the top of column I through line 18 which may be provided with a valve 19.

The solutions of neutral or of unsaponifiable matter in the solvent will usually contain traces of dissolved or entrained soaps and alcohols from the system in column I. In order to remove these constituents from the neutral or unsaponifiable matter, it is desirable to wash the solution with water. This operation also may be conducted in a counter-current manner by introducing the solution from the line 18 into column II at a point near, but preferably somewhat above the bottom of the column. Water from washing out the traces of soaps and other water soluble constituents entrained in or associated with the neutral or unsaponifiable matter in solution is introduced from a line 21 at a point near to but somewhat below the top of column II. The water is caused to disseminate or percolate downwardly through the upwardly flowing solution of unsaponifiable matter in much the same manner as are the various solutions in column I.

The washed solutions of neutral or of unsaponifiable matter in naphtha or similar solvent of lipoid matter is drawn off at or near the top of column II through line 22.

It may be passed to an appropriate recovery system such as a still in which the solvent medium, e. g. naphtha is evaporated off. An evaporator for this operation is indicated diagrammatically at 23. The neutral or the unsaponifiable matter may then be passed through a line 24 to a final stripping apparatus or apparatus designed for further treatment of the recovered products either for purposes of fractionating it or for appropriate treatment in order to obtain the ultimate constituents thereof or for purposes of transforming the constituents into other compounds designed for certain specific applications.

The extract solution of water and alcohol containing the soaps of fatty acids in solution is drawn off from the column I through a line 26 and may be passed to a recovery system indicated broadly at 27. In this system, the soaps may be acidified with sulfuric acid or other acid to liberate the free acids. The water and alcohol layer and fatty acid and naphtha layer can be separated by decantation methods. Similarly, the traces of soap extracted by the water wash in column II is drawn off at the bottom of the latter column by means of a line 28 and may be passed to the recovery system 27 or to any other appropriate recovery system for removal of the alcohol and water from the soaps which may be in solution. The free fatty acids and naphtha are taken off at 29 and the sodium salts, water, alcohol, etc. drawn off at 31. The naphtha can be stripped from the fatty acids in a suitable still and the fatty acids subjected to further purification if desired. The alcohol-water layer can be rectified to recover the alcohol.

If desired, the sodium soaps of the fatty acids can be recovered from the soap solution by conventional techniques, or soaps of metals such as calcium, lithium, or aluminum could be recovered by adding the proper salts to the soap solution and filtering the precipitated soaps. Such soaps would be of value in the preparation of lubrication greases.

In the operation of the system described for recovering the unsaponifiables (sterols and other higher alcohols), wool grease recovered from scouring wool with aqueous soap solution or by extracting it with a solvent such as naphtha may be employed. Substantial variation of the various factors such as the temperatures of the system at various points and the concentrations of the several solvents with respect to the wool grease constituents are permissible.

The columns may be operated at any appropriate temperature so long as the liquid phases retain their identity to a reasonable degree, that is the liquid media in the columns do not become excessively miscible or emulsify with each other. The column I may be operated at a temperature for example within a range of 120 to 180° F. Column II may also be operated within a similar range. A temperature of about 125 to 150° F. would appear to include the optimum temperatures for both columns.

The rates of feed of the soap solutions and the solvent media designed to contact therewith are so adjusted that the columns do not tend to flood, that is there should be no tendency to carry one or the other phase backward in a direction contrary to the normal direction of flow of the particular phase. Permissible rate of feed can be determined by observation of the operation of the particular system. So long as there is no flooding there is no separation of phases in the exact or raffinate after it is withdrawn from the column (provided the solution temperature is maintained). The rate of flow will depend entirely upon the size of the apparatus, the temperatures of operation and such like factors which are peculiar to the individual systems.

Alkali in approximately stoichiometric proportion or slight excess with respect to the free acids is used if neutral wool grease is the desired product, but if saponification of the fatty acids combined with the alcohols as esters should be desired, a larger amount is used. The alkali and wool grease in aqueous alcohol may be heated under reflux to hasten saponification. The general principles of saponification will be followed.

The solvent of lipoid matter employed to extract out the unsaponifiable matter from the soap solution, preferably, is in a higher ratio than 1 to 1 with respect to the soap solution upon a volume basis. Any reasonable higher ratio than this may be employed since the solvent medium is substantially immiscible with the soap solution. Proportions of 10, 20 or even higher volumes of solvent medium per volume of soap solution are within the purview of the invention.

The ratio of alcohol to water in the soap solutions fed to column I is susceptible of considerable variation but, in most instances, the alcohol will constitute 10 to 40% of the solution of the two. The proportion of wool grease in the system may also be greatly varied, for example over a range of 5 to 30% of the water-alcohol-wool fat mixture. The soap solution, of course, should not be excessively concentrated, since it tends to become more viscous with increase of concentration and if excessively viscous, might not readily flow through the apparatus, or might not readily commingle with solvent of neutral or unsaponifiable matters.

The following specific examples illustrate the application of the principles of the invention to the treatment of a crude wool grease to saponify the neutral esters as well as the free fatty acids and to obtain the unsaponifiable matter.

*Example I*

An unrefined wool grease was saponified by agitating and refluxing the following mixture:

| | Parts by weight |
|---|---|
| Unrefined wool grease | 1,500 |
| Isopropyl alcohol | 1,184 |
| Water | 500 |
| Sodium hydroxide flakes | 300 |

To the above mixture were added 6,433 parts by weight of water.

The soap solution was then extracted in column I in countercurrent with naphtha (about a heptane fraction) and the naphtha extract water washed in column II. The conditions of operation were as follows:

| | |
|---|---|
| Soap solution feed—column I | 30 parts by vol. |
| Naphtha feed containing 5% isopropanol—column I | 60 parts by vol. |
| Column I—temperature | 130–140° F. |
| Water feed to column II | 150 parts by vol. |
| Naphtha extract feed to column II | 50 parts by vol. |
| Column II—temperature | 130–140° F. |

The washed naphtha extract was then evaporated and the solvent recovered. The yield of soap free unsaponifiable matter from column II in this run was 36.6% based on weight of unrefined wool grease. The yield 90.5% of the total unsaponifiable matter is removed from the soap solution. A Liebermann-Burchard test indicated 38.2% sterols in the unsaponifiable fraction.

The soaps in the water-isopropanol phase were acidified and the free fatty acids were recovered.

*Example II*

An unrefined wool grease was saponified by agitating and refluxing the following mixture:

| | Pounds |
|---|---|
| Wool grease | 100 |
| Isopropanol | 55.5 |
| Caustic soda | 15.0 |
| Water | 52.5 |

The above solution was diluted with 374 lb. of water and 101.5 lb. of isopropanol and used as a feed in a countercurrent extraction with naphtha (heptane fraction in column I). The naphtha extract was then washed with a mixture of isopropanol and water in column II. The use of a mixture of isopropanol and water instead of water aids in preventing emulsification in the wash column. The column conditions in the extraction were as follows:

COLUMN I

| | |
|---|---|
| Soap solution feed | 30 parts by vol. |
| Naphtha feed containing 5% isopropanol | 60 parts by vol. |
| Column I—temperature | 145° F. |

Adding 5 isopropanol in the naphtha aids in the extraction in column I.

COLUMN II

| | |
|---|---|
| Naphtha extract feed | 70 parts by vol. |
| 20% isopropanol—80% water feed | 70 parts by vol. |
| Column II—temperature | 135° F. |

The extraction and washing columns performed well and upon quantitatively checking the unsaponifiable matter remaining in the soap solution, it was found that 97% of the unsaponifiable matter was removed and was recovered by evaporating the naphtha. The fatty acids were recovered at 27.

Crude wool grease may also be treated for purposes of removing the free fatty acid content thereof without substantially reducing the content of combined acids and to obtain a neutral grease consisting primarily of the esters of various higher fatty acids and hydroxy compounds such as higher alcohols, sterols and the like. A soap solution comprising the neutral esters and the neutralized free fatty acids of the wool grease can be diluted with a lower alcohol in such a fashion that any neutral material can be extracted with an immiscible hydrocarbon type solvent by countercurrent contact in the apparatus already described. In the operation of such process, alkali such as sodium hydroxide is added in an amount to neutralize the acid present and then water and a lower alcohol are added. The amount of alkali is only that necessary to obtain neutralization of the free fatty acids.

In the washing of wool, a liquor containing a detergent such as fatty acid soaps with emulsified wool grease is obtained. This mixture may contain no free acids or would not upon the addition of small amount of alkali. The washing liquors containing these soaps together with the neutral esters and unsaponifiable matter may be incorporated with enough alcohol such as ethyl alcohol or isopropyl alcohol to obtain a mixture when shaken, or otherwise thoroughly intermingled with hydrocarbon type solvents that will readily unmix to form separate liquid layers.

The proportioning of the alcohol and water can be determined by shaking together small quantities of the water and alcohol solution with the hydrocarbon solvent in a beaker or flask, as already described to determine when the solutions will readily separate into phases.

Example III

A sample of crude wool grease was saponified as follows:

| | Pounds |
|---|---|
| Crude wool grease | 424 |
| 80% isopropyl alcohol | 294 |
| Water | 164 |
| Sodium hydroxide | 63.6 |

The mixture was refluxed and agitated for 6 hours and then diluted with 1509 lb. of water and 375 lb. of 80% isopropyl alcohol. The final composition of this solution in terms of starting materials is as follows:

| | Percent |
|---|---|
| Wool grease (saponified) | 15.0 |
| Isopropyl alcohol | 19.0 |
| Alkali (partially combined) | 2.2 |
| Water | 63.8 |

This solution was extracted countercurrently as follows:

COLUMN I

| | |
|---|---|
| Soap feed | 270 cc./min. |
| Naphtha containing 5% isopropyl alcohol | 400 cc./min. |
| Temperature | 140–145° F. |

COLUMN II

| | |
|---|---|
| Naphtha solution | all from column I |
| Water containing 20% isopropyl alcohol | 500 cc./min. |

The soaps of fatty acids as recovered in the water-isopropyl alcohol phase could be treated with acids to liberate the free fatty acids. The neutral or unsaponified matter in naphtha could be recovered by evaporating the naphtha. It could be used, with or without further treatment as an emulsifying agent, in cosmetics and pharmaceuticals.

The following specific example illustrates the application of these broader principles of the invention to the separation of the fatty acids of wool grease from the neutral grease.

EXAMPLE IV

An unrefined wool grease was neutralized by agitating the following mixture at 45–5°5 C.

| | Parts by weight |
|---|---|
| Unrefined wool grease | 1,500 |
| Isopropyl alcohol | 600 |
| Water | 750 |
| Sodium hydroxide flakes | 36.6 |

The above mixture was diluted with 740 parts by weight isopropyl alcohol and 1,485 parts by weight water.

The neutralized grease solution was then extracted countercurrently in column I with naphtha (near a heptane fraction boiling in a range of 80 to 130° C.). The naphtha extract was water washed in a column II. Column conditions were as follows:

COLUMN I

| | |
|---|---|
| Neutralized grease solution | 18 parts by vol. |
| Naphtha feed | 63 parts by vol. |
| Extraction column temperature | 140° F. |

COLUMN II

| | |
|---|---|
| Water feed to wash column | 78 parts by vol. |
| Napththa extract feed to wash column | 38 parts by vol. |
| Wash column temperature | 140° F. |

The water washed naphtha extract was then passed to a still where the solvent was recovered. The yield of soap free neutral wool grease was 75.3% based on original unrefined wool grease. This grease had a free fatty acid content of 1.96% and ash content of 0.021 and is capable of being bleached to a light color by use of concentrated 90% $H_2O_2$.

Assuming that unacidified wool grease, that is wool grease containing the scouring soaps is to be treated to eliminate the fatty acid soaps from the neutral grease in accordance with the provisions of the present invention, the scouring water, either with or without concentration, e. g. by evaporation could be made up with a lower alcohol such as isopropyl alcohol or ethyl alcohol to obtain a mixture which, by the shaking test, would separate rapidly from a paraffinic hydrocarbon type solvent such as paraffinic naphtha boiling in the range of 80 to 130° C. A solution so prepared could be extracted countercurrently in the columns I and II as already described and the neutral grease recovered from its solution in naphtha as obtained from the column II.

A further extension of the principles of the invention would be to add additional alkali to the unacidified grease or solution of grease in water as obtained in the washing of wool. The concentration of grease, if desired, could be preliminarily increased by evaporation of a portion of the water in order to reduce the volume of material required to be handled in the extract columns. Alkali in such process should be added in amounts sufficient to saponify the neutral esters, thereby forming soaps of the fatty acids in the esters and releasing the higher alcohol components of the esters as unsaponifiable matter. The solutions of soaps and unsaponfiable matter as thus obtained, could be made up with additional isopropyl or ethyl alcohol to obtain solutions that would readily separate upon contact with paraffinic naphtha or similar solvent of lipoid matter. The contact of the soap solutions with the solvent could be conducted readily in the apparatus as previously described to obtain a solution of soaps of fatty acids in water and ethyl or isopropyl alcohol and a solution of the unsaponifiable matter including the cholesterol, agnosterol, lanosterol, cholestanol and the like in the hydrocarbon solvent. The soaps or their free fatty acids and the unsaponifiable matter could readily be recovered by appropriate technique such as evaporation of the solvent media.

It will be apparent to those skilled in the art that the invention as described is not limited to the specific embodiments herein disclosed but that numerous modifications may be made therein without departure from the spirit of the invention or the scope of the appended claims.

We claim:

1. In a process of treating wool fat, the steps of adding sodium hydroxide thereto in an amount to provide a mixture consisting of neutral wool fat components and soaps of wool fat acids, preparing a solution containing the mixture in a concentration of 5 to 30% of the water-alcohol-wool fat mixture in a medium which in turn is a solution of water and a water soluble aliphatic monohydric alcohol containing 1 to 4 carbon atoms per molecule the solution of water and said alcohol containing 10 to 40% of the alcohol then flowing the solution as a continuous stream into an upper portion of an elongated extraction zone at a temperature of 120 to 180° F., simultaneously flowing a stream of naphtha into a lower portion of the zone, the naphtha being in a proportion of 1 to 20 volumes per volume of the solution introduced into the upper portion of the zone, then continuously drawing off at the top of the zone a naphtha solution of the neutral components of wool fat and recovering said components from the solution.

2. In a process of obtaining a concentrate comprising the neutral esters and the unsaponifiable components of wool fat, the steps of adding sodium hydroxide to wool fat in an amount sufficient to neutralize the free fatty acids of the wool fat without saponifying the esters, preparing a solution containing the resultant mixture of soaps and unsaponified matter in a concentration of 5 to 30% of the water-alcohol-wool fat mixture in a medium which in turn is a solution of water and a water soluble aliphatic monohydric alcohol containing 1 to 4 carbon atoms per molecule, said alcohol constituting 10 to 40% of the water-alcohol mixture, flowing the solution continuously into an upper portion of an elongated extraction zone which is at a temperature of 120 to 180° F., continuously flowing naphtha in a proportion of 1 to 20 volumes per volume of solution into a lower portion of the same zone, flowing the solution and the naphtha continuously and countercurrently through each other in intimate contact, continuously drawing off at the top of the zone a solution of the neutral esters and the unsaponifiable matter in naphtha and recovering said neutral esters and the unsaponifiable matter from the naphtha solution.

3. In a process of treating wool fat, the steps of adding sodium hydroxide to wool fat in an amount to saponify the free fatty acids and the neutral esters of wool fat, whereby to provide a mixture of unsaponifiable matter of wool fat and soaps of wool fat acids, preparing a solution containing the mixture in a concentration of 5 to 30% in a medium which is a mixture of water and a lower water soluble aliphatic alcohol of 1 to 4 carbon atoms, said alcohol constituting 10 to 40% of the medium, then flowing the solution continuously into an upper portion of a vertically elongated extraction zone, which zone is at a temperature of 120 to 180° F. and correspondingly introducing naphtha in a proportion of 1 to 20 volumes per volume of solution into a lower portion of the same zone, flowing the naphtha and the solution continuously and countercurrently through each other, continuously drawing off at the top of the extraction zone a solution of naphtha and unsaponifiable matter and recovering the unsaponifiable matter from said solution, then washing off the residual soaps from the naphtha solution by contacting the latter with water.

4. In a process of obtaining a concentrate of the unsaponifiable matter of wool fat, the steps which comprise saponifying wool fat with an alkali metal saponifying agent in a medium selected from the group consisting of water and aqueous solutions of a water soluble aliphatic monohydric alcohol of 1 to 4 carbon atoms, adjusting alcohol content to provide a solution of a mixture of alkali metal soaps of wool fat acids and unsaponifiable matter of wool fat in water and the alcohol wherein the unsaponifiable matter is present in the solution in a concentration of 5 to 30 per cent of water-alcohol-wool fat mixture, the alcohol constituting 10 to 40 per cent of the water-alcohol mixture, flowing the solution in a continuous stream to an upper portion of an elongated extraction zone at a temperature of 120 to 180° F., simultaneously, continuously flowing a stream of naphtha in a proportion of 1 to 20 volume per volume of said solution into a lower portion of the zone, continuously drawing off at the top of the zone a naphtha solution of unsaponifiable matter and recovering the unsaponifiable matter from the solution.

ROGER M. CHRISTENSON.
RALPH E. HARPT.

REFERENCES CITED

The following references are of record in the file of this patent:

UNITED STATES PATENTS

| Number | Name | Date |
|---|---|---|
| 649,454 | Hopkinson | May 15, 1900 |
| 680,977 | Hopkinson | Aug. 20, 1901 |
| 2,248,619 | Freedman et al. | July 8, 1941 |

OTHER REFERENCES

Lewkowitsch, "Chemical Technology, and Analysis of Oils, Fats and Waxes," 6th ed., vol. 1, pages 656–657, MacMillan and Co., London, (1938).